United States Patent
Hirano et al.

(10) Patent No.: US 12,000,020 B2
(45) Date of Patent: Jun. 4, 2024

(54) METAL AND TIN ALLOY HAVING LOW ALPHA-RAY EMISSION, AND METHOD FOR PRODUCING SAME

(71) Applicant: MITSUBISHI MATERIALS CORPORATION, Tokyo (JP)

(72) Inventors: Hirotaka Hirano, Sanda (JP); Yoshihiro Yoshida, Sanda (JP); Takuma Katase, Sanda (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 17/991,018

(22) Filed: Nov. 21, 2022

(65) Prior Publication Data
US 2023/0085708 A1    Mar. 23, 2023

Related U.S. Application Data

(62) Division of application No. 16/638,770, filed as application No. PCT/JP2018/030211 on Aug. 13, 2018, now abandoned.

(30) Foreign Application Priority Data

Aug. 17, 2017  (JP) .................................. 2017-157394
Jul. 30, 2018   (JP) .................................. 2018-142195

(51) Int. Cl.
C22C 13/00    (2006.01)
B23K 35/26    (2006.01)
(Continued)

(52) U.S. Cl.
CPC ............ *C22C 13/00* (2013.01); *B23K 35/262* (2013.01); *C22B 11/00* (2013.01); *C22B 13/08* (2013.01);
(Continued)

(58) Field of Classification Search
CPC ....... C22C 13/00; C22C 2202/00; C22C 5/06; B23K 35/262; B23K 2101/40;
(Continued)

(56) References Cited

U.S. PATENT DOCUMENTS

2009/0098012 A1    4/2009    Shindo et al.
2013/0028786 A1*   1/2013    Kanou .................... C22B 25/08
                                                            164/47
(Continued)

FOREIGN PATENT DOCUMENTS

| CN | 101213326 A | 7/2008 |
|----|-------------|--------|
| JP | 3528532 B2  | 5/2004 |

(Continued)

OTHER PUBLICATIONS

Office Action issued in U.S. Appl. No. 16/638,770, dated Feb. 1, 2021.
(Continued)

*Primary Examiner* — Adil A. Siddiqui
(74) *Attorney, Agent, or Firm* — Locke Lord LLP; James E. Armstrong, IV; Nicholas J. DeCieglie, Jr.

(57) ABSTRACT

Any metal having a low α-ray emission, the metal being any one of tin, silver, copper, zinc, or indium, wherein an emission of an α-ray after heating the metal at 100° C. in an atmosphere for six hours is 0.002 cph/cm² or less. Any metal of tin, silver, copper, zinc and indium each including lead as an impurity is dissolved to prepare a hydrosulfate aqueous solution of the metal and lead sulfate is precipitated and removed in the solution. The lead sulfate is precipitated in the hydrosulfate aqueous solution by adding a lead nitrate aqueous solution including lead having an α-ray emission of 10 cph/cm² or less to the hydrosulfate aqueous solution, from which the lead sulfate has been removed, and, at the same time, the solution is circulated while removing the lead (Continued)

sulfate to electrowinning the metal using the hydrosulfate aqueous solution as an electrolytic solution.

5 Claims, 3 Drawing Sheets

(51) Int. Cl.
| | |
|---|---|
| *B23K 101/40* | (2006.01) |
| *C22B 3/00* | (2006.01) |
| *C22B 11/00* | (2006.01) |
| *C22B 13/08* | (2006.01) |
| *C22B 19/32* | (2006.01) |
| *C22B 25/08* | (2006.01) |
| *C22B 58/00* | (2006.01) |
| *C25C 1/12* | (2006.01) |
| *C25C 1/14* | (2006.01) |
| *C25C 1/16* | (2006.01) |
| *C25C 1/20* | (2006.01) |
| *C25C 1/22* | (2006.01) |

(52) U.S. Cl.
CPC .............. *C22B 19/32* (2013.01); *C22B 25/04* (2013.01); *C22B 25/08* (2013.01); *C22B 58/00* (2013.01); *C25C 1/12* (2013.01); *C25C 1/14* (2013.01); *C25C 1/16* (2013.01); *C25C 1/20* (2013.01); *C25C 1/22* (2013.01); *B23K 2101/40* (2018.08); *C22C 2202/00* (2013.01)

(58) Field of Classification Search
CPC ......... C22B 13/08; C22B 25/08; C22B 11/00; C22B 19/32; C22B 58/00; C22B 25/04; C25C 1/12; C25C 1/14; C25C 1/16; C25C 1/20; C25C 1/22
USPC ......................................................... 75/743
See application file for complete search history.

(56) References Cited

U.S. PATENT DOCUMENTS

| | | |
|---|---|---|
| 2014/0010705 A1 | 1/2014 | Kanou |
| 2014/0060252 A1 | 3/2014 | Jung et al. |
| 2015/0217409 A1 | 8/2015 | Akagawa et al. |
| 2016/0097139 A1 | 4/2016 | Takemoto et al. |

FOREIGN PATENT DOCUMENTS

| | | |
|---|---|---|
| JP | 4472752 B2 | 6/2010 |
| JP | 2011-214040 A | 10/2011 |
| JP | 2011-214061 A | 10/2011 |
| JP | 2014-169502 A | 9/2014 |
| JP | 2016-074969 A | 5/2016 |
| JP | 6080946 B2 | 2/2017 |
| JP | 2017-057451 A | 3/2017 |
| JP | 2017-510706 A | 4/2017 |
| KR | 10-2015-0089957 A | 8/2015 |
| TW | 201410921 A | 3/2014 |
| WO | 2011/114824 A1 | 9/2011 |
| WO | 2012/120982 A1 | 9/2012 |
| WO | 2015/126631 A1 | 8/2015 |

OTHER PUBLICATIONS

Final Office Action issued in U.S. Appl. No. 16/638,770, dated Jun. 15, 2021.
Office Action issued in U.S. Appl. No. 16/638,770, dated Mar. 25, 2022.
Final Office Action issued in U.S. Appl. No. 16/638,770, dated Aug. 24, 2022.
B. Narasimham et al., "Influence of Polonium Diffusion at Elevated Temperature on the Alpha Emission Rate and Memory SER Performance", IEEE, 2017, pp. 3D-4.1-3D-4.8. (discussed in the spec).
K. Hoffmann, Otto Hahn : achievement and responsibility, Springer Japan, 2006, p. 32 and p. 33.
E. Shpol'skii, Atomic Physics III, Tokyo Tosho Co.,Ltd., (Physics Selection Book), 1958, p. 180 and p. 181.
I. Michiyoshi, Introduction to Nuclear Engineering, Rikogakusha Publishing Co., Ltd., 1984, pp. 10 to 25.
H. Kawasaki, Studies on Surface Chemical Reaction of Metal Powder for Soldering in Packaging Technology, 2016, 132 pages including partial English translation.
International Search Report dated Oct. 23, 2018, issued for PCT/JP2018/030211 and English translation thereof.
Office Action dated Apr. 15, 2020, issued for Taiwanese Patent Application No. 107128457 and English translation thereof.
Notice of Reason for Cancellation dated Feb. 17, 2020, issued for Japanese patent application No. 2018-142195 and English translation thereof.
Office Action dated Jun. 10, 2020, issued for Chinese Patent Application No. 201880052602.8 and English translation thereof.
Notice of Allowance dated Aug. 19, 2020, issued for Korean Patent Application No. 10-2019-7038175 and English translation thereof.

* cited by examiner

METAL AND TIN ALLOY HAVING LOW ALPHA-RAY EMISSION, AND METHOD FOR PRODUCING SAME

CROSS REFERENCE TO RELATED APPLICATIONS

This Application is a Divisional of U.S. patent application Ser. No. 16/638,770, filed on Feb. 13, 2020, which application is a U.S. 371 National Phase Patent Application of International PCT Patent Application No. PCT/JP2018/030211, filed on Aug. 13, 2018, which application claims priority to Japanese Patent Application No. 2018-142195, filed on Jul. 30, 2018, and Japanese Patent Application No. 2017-157394, filed on Aug. 17, 2017. The entire contents of these applications are incorporated herein by reference in their entirety.

TECHNICAL FIELD

The present invention relates to any metal having a low α-ray emission of tin, silver, copper, zinc, or indium which is preferred for a solder material for producing electronic components and has an extremely small α-ray emission. In addition, the present invention relates to an alloy having a low α-ray emission of one or more metals selected from a group consisting of silver, copper, zinc, indium, bismuth, nickel, and germanium and tin (hereinafter, referred to as the tin alloy). Furthermore, the present invention relates to each method for producing the metal or the tin alloy having a low α-ray emission.

Priority is claimed on Japanese Patent Application No. 2017-157394, filed on Aug. 17, 2017 and Japanese Patent Application No. 2018-142195, filed on Jul. 30, 2018, the contents of which are incorporated herein by reference.

BACKGROUND ART

As solder materials for producing electronic components, development of solder materials containing Pb-free tin (Sn) as a principal metal, for example, tin alloys such as Sn—Ag—Cu, Sn—Ag, Sn—Cu, Sn—Zn, Sn—In, Sn—Bi, and the like is underway for the reason that lead (Pb) has an adverse influence on the environment.

In addition, alloys obtained by adding a small amount of a component such as Ni, Ge, or the like to the above-described alloy are being developed. Such solder materials are used for the production of semiconductor devices such as joining of a chip and a substrate in a semiconductor memory and the like.

Even for Pb-free solder materials, it is extremely difficult to completely remove Pb from Sn which is a principal solder material, and a small amount of Pb is included in Sn as an impurity.

In recent years, it has been found that, in semiconductor devices having a density and a capacity that are increasing more and more, an α ray that is emitted from $^{210}$Po generated from $^{210}$Pb which is an isotope of Pb is one cause for the generation of a soft error. Therefore, there is a demand for tin having a low α-ray emission which rarely emits α rays attributed to $^{210}$Pb included as an impurity. In addition, in the current market, the α-ray emission of a product that is most broadly distributed is 0.002 cph/cm$^2$ or less, and, as one index, it is considered to be important that the α-ray emission is 0.002 cph/cm$^2$ or less. In addition, in response to the diversification of the operation environment of products, there is an intensifying demand for products having an α-ray emission of 0.001 cph/cm$^2$ or less.

As a method for obtaining tin having a low α-ray emission, a method for producing tin having a low α-ray emission in which an alloy of tin and lead having an α-ray emission of 10 cph/cm$^2$ or less is produced and then refined to remove lead included in tin is disclosed (for example, refer to PTL 1 (claim 1, Paragraph [0011] to Paragraph [0016], and Paragraph [0022])).

In a method of Example 1 in PTL 1, commercially available Sn having a surface α-ray emission of 5 cph/cm$^2$ and a purity of 99.99% and commercially available Pb having a surface α-ray emission of 10 cph/cm$^2$ and a purity of 99.99% are prepared, and Sn and Pb are dissolved in a high-purity graphite crucible using a high-frequency induction furnace in a nitrogen atmosphere, thereby producing a Sn-5 wt % Pb alloy. In addition, this alloy is put into the high-purity graphite crucible, heated and fused to evaporate and remove Pb, and cooled, and then Sn remaining in the crucible is rolled, thereby producing a Sn plate having a low α-ray emission.

In addition, as another method for obtaining tin having a low α-ray emission, a method in which tin serving as a raw material is leached using an acid such as sulfuric acid, then, this leached liquid is used as an electrolytic solution, any one or more of titanium oxide, aluminum oxide, tin oxide, activated carbon, and carbon that are impurity adsorbents are suspended in the electrolytic solution, and electrolytic purification is carried out using a raw material Sn anode, thereby obtaining high-purity tin having a content of U being 5 ppb or less, a content of Th being 5 ppb or less, a content of Pb being 1 ppm or less, a content of Bi being 1 ppm or less, and a purity being 5N or more (here, the gas components of O, C, N, H, S, and P are excluded) is disclosed (for example, refer to PLT 2 (claim 3 and Paragraph [0014])).

In PTL 2, it is described that the high-purity tin or tin alloy produced using the above-described method is produced by dissolving and casting in the end, but the number of counts of an α-ray of the high-purity tin having a cast structure of the tin can be set to 0.001 cph/cm$^2$ or less.

Meanwhile, in recent years, there has been a report regarding a problem with the generation rate of a soft error which increases when a chip joined to a substrate by soldering is exposed to a high-temperature environment during use compared with that in the initial phase of use (for example, refer to NPL 1 (Abstract)).

According to this report, the increase in the generation rate of a soft error is attributed to an increase in the α-ray emission of a solder material in a high-temperature environment.

CITATION LIST

Patent Literature

[PTL 1] Japanese Patent No. 3528532(B)
[PTL 2] Japanese Patent No. 4472752(B)

Non-Patent Literature

[NPL 1] B. Narasimham et al. "Influence of Polonium Diffusion at Elevated Temperature on the Alpha Emission Rate and Memory SER", IEEE, pp 3D-4.1-3D-4.8, 2017

DISCLOSURE OF INVENTION

Technical Problem

From the report of NPL 1, it has been clarified that an increase in the α-ray emission derived from the solder material when a device is exposed to a high-temperature environment leads to an increase in a soft error. That is, not only the α-ray emission in the initial phase at which tin is just produced but also the α-ray emission of the tin exposed to a high-temperature environment need to be an α-ray emission that remains unchanged from the initial value and to be 0.002 cph/cm² or less.

Actually, the present inventors confirmed that, even when the initial α-ray emission of tin is 0.001 cph/cm² or less, there is a case where a necessary low α-ray emission of tin cannot be obtained under heating that corresponds to a high-temperature environment.

However, PTL 1 and 2 do not discuss the α-ray emission in a high-temperature environment of tin joined by soldering, and, in the metallic tin obtained in PTL 1 and 2, there is a concern that the α-ray emission of tin when exposed to a high-temperature environment exceeds 0.001 cph/cm² or exceeds even 0.002 cph/cm².

In addition, in the method of PTL 1, as a method for adding high-purity tin to the raw material tin, there has been a demand for a simpler production method since Sn and Pb need to be dissolved in a high-purity graphite crucible using a high-frequency induction furnace in a nitrogen atmosphere and thus a long period of time and a large amount of heat energy are required for production.

In addition, Table 1 of PTL 2 shows that the content of Pb in the raw material tin changes from 220 wtppm to 0.06 wtppm in Example 4 after refining, and thus a proportion of the concentration of Pb in the raw material tin decreased is approximately a maximum of ¼,₀₀₀.

Here, $^{210}$Pb to which the α-ray emission is attributed shows the same behavior as non-radioactive stable Pb, and thus the proportion of $^{210}$Pb decreased is also approximately a maximum of ¼,₀₀₀, which shows that a decrease in the concentration of $^{210}$Pb has a limitation.

Therefore, it is not certain that the method of PTL 2 is capable of coping with raw material tin having a high concentration of Pb as an impurity, and there is a concern that, when the concentration of Pb in the raw material tin becomes high, it may not be possible to attain an α-ray emission of 0.001 cph/cm² or less.

An object of the present invention is to provide any metal of tin, silver, copper, zinc and indium or a tin alloy having a low α-ray emission in which, even when the metal or the tin alloy is heated, the α-ray emission does not increase regardless of the concentration of $^{210}$Pb in raw material tin and the α-ray emission is 0.002 cph/cm² or less. Another object of the present invention is to provide a method for producing the metal or the tin alloy having a low α-ray emission using a liquid phase method.

Solution to Problem

As a result of intensive studies for attaining the above-described objects, the present inventors proposed a method for decreasing the concentration of $^{210}$Pb included in raw material tin in a liquid phase without depending on a thermal fusion method as described in PTL 1 in which raw material tin and lead having a low α-ray emission are dissolved in a crucible to produce an alloy, thereby decreasing the concentration of $^{210}$Pb included in the raw material tin. In addition, the degree of the decrease is adjusted, thereby attaining the present invention obtaining a metal having an α-ray emission that does not increase even when the metal is used in a state of being exposed to a high-temperature environment.

A first aspect of the present invention is a metal having a low α-ray emission, the metal being any one of tin, silver, copper, zinc, or indium, wherein an emission of an α-ray after heating the metal at 100° C. in an atmosphere for six hours is 0.002 cph/cm² or less.

A second aspect of the present invention is a tin alloy having a low α-ray emission, the tin alloy being an alloy of the tin having a low α-ray emission according to the first aspect and one or more metals selected from a group consisting of silver, copper, zinc, indium, bismuth, nickel, and germanium, wherein an emission of an α-ray after heating the tin alloy at 100° C. in an atmosphere for six hours is 0.002 cph/cm² or less.

A third aspect of the present invention is the tin alloy having a low α-ray emission according to the second aspect, wherein the metal that forms the tin alloy with the tin having a low α-ray emission is one or more metals selected from a group consisting of silver, copper, zinc, and indium.

A fourth aspect of the present invention is the metal or the tin alloy having a low α-ray emission according to any one of the first to the third aspects, wherein the emission of an α-ray of the metal or the tin alloy after heating the metal or the tin alloy at 200° C. in an atmosphere for six hours is 0.002 cph/cm² or less.

A fifth aspect of the present invention is a method for producing a metal having a low α-ray emission, the method including: a step (a) of dissolving any metal (M) of tin, silver, copper, zinc and indium each including lead (Pb) as an impurity in a sulfuric acid aqueous solution ($H_2SO_4$) to prepare a hydrosulfate ($MSO_4$) aqueous solution of the metal and precipitating lead sulfate ($PbSO_4$) in the hydrosulfate aqueous solution as shown in FIG. 1(a); a step (b) of filtering the hydrosulfate aqueous solution of the step (a) to remove the lead sulfate from the hydrosulfate aqueous solution as shown in FIG. 1(b); a step (c) of precipitating lead sulfate in the hydro sulfate aqueous solution by adding a lead nitrate ($PbNO_3$) aqueous solution of a predetermined concentration including lead having an α-ray emission of 10 cph/cm² or less to the hydrosulfate aqueous solution of the step (b), from which the lead sulfate has been removed, at a predetermined addition rate for 30 minutes or longer while stirring the hydrosulfate aqueous solution at a rotation rate of at least 100 rpm in a first tank, and, at the same time, circulating the hydrosulfate aqueous solution in the first tank at a proportion at which a circulation flow rate reaches at least 1% by volume of a total liquid amount while filtering the hydrosulfate aqueous solution to remove the lead sulfate from the hydrosulfate aqueous solution as shown in FIG. 1(c); and a step (d) of transferring the hydrosulfate aqueous solution of the step (c) to a separate second tank from the first tank and then electrowinning the metal (M) using the hydrosulfate aqueous solution as an electrolytic solution as shown in FIG. 1(d).

A sixth aspect of the present invention is the method for producing a metal having a low α-ray emission according to the fifth aspect, wherein the predetermined concentration of lead nitrate in the lead nitrate aqueous solution of the step (c) is 10% by mass to 30% by mass.

A seventh aspect of the present invention is the method for producing a metal having a low α-ray emission according to the fifth or sixth aspect, wherein the predetermined addition rate of the lead nitrate aqueous solution of the step (c) is 1 mg/second to 100 mg/second with respect to one liter (hereinafter, indicated as L) of the hydrosulfate aqueous solution.

An eighth aspect of the present invention is a method for producing a tin alloy having a low α-ray emission, the method comprising the step of producing the tin alloy having a low α-ray emission by adding one or more metals selected from a group consisting of silver, copper, zinc, indium, bismuth, nickel, and germanium to metallic tin and mixing thereof to obtain a mixture, and casting the mixture, wherein the metallic tin is metallic tin produced using the method according to any one of the fifth to seventh aspects, and the metal being added to the metallic tin has an α-ray emission of 0.002 cph/cm² or less.

A ninth aspect of the present invention is a method for producing a tin alloy having a low α-ray emission, the method comprising the step of producing the tin alloy having a low α-ray emission by adding one or more metals selected from a group consisting of silver, copper, zinc, and indium to metallic tin and mixing thereof to obtain a mixture, and casting the mixture, wherein each of the metallic tin and the one or more metals added to the metallic tin is the metal produced using the method according to any one of the fifth to seventh aspects.

Advantageous Effects of Invention

The any metal having a low α-ray emission of tin, silver, copper, zinc, and indium of the first aspect of the present invention and the tin alloys having a low α-ray emission of the second and third aspects of the present invention each have a characteristic of an α-ray emission that does not increase in the initial phase of production and even after a long period of time elapses from production, the α-ray emission not increasing even when the metal or the tin alloys are heated at 100° C. in an atmosphere for six hours and remaining at 0.002 cph/cm² or less. Therefore, even when the metal or the tin alloy having a low α-ray emission of the first to third aspects is used as a solder material in a semiconductor device for the joining of a chip and a substrate and this semiconductor device is exposed to a high-temperature environment, only an extremely small amount of an α-ray is emitted from the metal or the tin alloy included in the solder, and there is a low possibility of the generation of a soft error.

The reason for setting the heating condition to "100° C. for six hours" in the invention of the first aspect is the actual operation environment being estimated to be approximately 100° C. and, regarding the time, to clarify a measurement condition since it is confirmed that heating for six hours causes approximately the same degree of increase as heating for a long period of time.

The reason for setting the heating condition to "200° C. for six hours" in the invention of the fourth aspect is to clarify a measurement condition since the α-ray emission is likely to increase as the heating temperature increases, and, when the heating temperature exceeds 200° C., when the metal is tin, the heating temperature becomes close to the dissolving point of tin that is 232° C., and a sample is dissolved. Therefore, it can be also said that, in the metal having a low α-ray emission in the present invention, when the metal is tin, the α-ray emission does not increase even when the metal is heated at a temperature that is equal to or lower than the dissolving point of tin, and the α-ray emission remains at 0.002 cph/cm² or less.

An α ray from a solder material is emitted from $^{210}Po$, but a tendency is known that, when $^{210}Pb$ that is a parent nuclide is present, the α-ray emission increases in accordance with the half-life period of $^{210}Pb$. Therefore, it is a very important element to confirm that the α-ray emission changes as the time elapses. This increase in the α-ray emission can be calculated by simulation, and the maximum value is reached on approximately the $828^{th}$ day. Therefore, in order to confirm the presence or absence of a change in the α-ray emission attributed to the elapsing of time, it is preferable to confirm the change for up to 828 days. The α-ray emission changes in a quadratic curve manner as the time elapses, and, after the elapsing of one year, the α-ray emission changes at a proportion of 80% or more of the maximum change. Therefore, in the present invention, it is confirmed that the α-ray emission does not change over time by confirming the fact that the α-ray emission does not change after one year.

In the method for producing a metal having a low α-ray emission of the fifth aspect of the present invention, unlike a thermal fusion method as described in PTL 1 in which raw material tin and lead having a low α-ray emission are dissolved in a crucible to produce an alloy, thereby decreasing the concentration of $^{210}Pb$ included in the raw material tin, any metallic raw material of tin, silver, copper, zinc, or indium each including lead as an impurity is turned into a tin sulfate aqueous solution, and lead sulfate being generated in the aqueous solution is removed by filtering.

After that, the concentration of $^{210}Pb$ included in the metallic raw material is decreased using a liquid-phase method in which the hydrosulfate aqueous solution of this metallic raw material is reacted with a lead nitrate aqueous solution including lead (Pb having a small content of $^{210}Pb$) having a low α-ray emission so as to precipitate an ion of lead (Pb having a large content of $^{210}Pb$) having a high α dose in the hydrosulfate aqueous solution as lead sulfate while substituting an ion of the lead into an ion of lead (Pb having a small content of $^{210}Pb$) having a low α-ray amount and to remove the ion of the lead having a large α dose by filtering.

Therefore, in this method, it is possible to more conveniently produce a metal having a low α-ray emission compared with in the method of PTL 1. In this method, the lead nitrate aqueous solution of a predetermined concentration is added at a predetermined addition rate for 30 minutes or longer, and the hydrosulfate aqueous solution is circulated in a tank while being filtered so as to remove the lead sulfate, and thus it is possible to decrease $^{210}Pb$ in a necessary proportion in accordance with the amount of the lead impurity included in the metallic raw material and the final target α-ray emission.

Therefore, in the any metal of tin, silver, copper, zinc and indium obtained in the end, the α dose attributed to $^{210}Pb$ significantly decreases more than the α dose of the tin produced in PTL 1, and not only the α-ray emission in the initial phase of production and even after a long period of time elapses from production but also the α-ray emission even after the metal is heated at 100° C. or 200° C. in an atmosphere for six hours do not significantly change from the initial value.

In addition, in this method, the concentration of $^{210}Pb$ can be continuously decreased, and thus, theoretically, it is possible to produce the metal having a low α-ray emission regardless of the concentration of $^{210}Pb$ in a metallic raw material being used.

In the method for producing a metal having a low α-ray emission of the sixth aspect of the present invention, the concentration of lead nitrate in the lead nitrate aqueous solution in the step (c) is set to 10% by mass to 30% by mass, whereby lead ($^{210}Pb$) derived from the metallic raw material can be more reliably precipitated and removed, and thus the α-ray emission of the any metal of tin, silver, copper, zinc and indium after heating further decreases.

In the method for producing a metal having a low α-ray emission of the seventh aspect of the present invention, the addition rate of the lead nitrate aqueous solution in the step (c) is set to 1 mg/second to 100 mg/second with respect to 1 L of the hydrosulfate aqueous solution, whereby lead ($^{210}$Pb) derived from the metallic raw material can be still more reliably precipitated and removed, and thus the α-ray emission of the any metal of tin, silver, copper, zinc and indium after heating still more decreases.

In the method for producing a tin alloy having a low α-ray emission of the eighth aspect of the present invention, the metallic tin having a low α-ray emission produced in the fifth to seventh aspects is cast after the addition of a metal such as silver having an α-ray emission of 0.002 cph/cm$^2$ or less thereto, thereby producing a tin alloy, and thus, similar to the invention based on the fifth aspect, theoretically, it is possible to produce a tin alloy having a low α-ray emission regardless of the concentration of $^{210}$Pb in a tin raw material being used.

In the method for producing a tin alloy having a low α-ray emission of the ninth aspect of the present invention, the metallic tin having a low α-ray emission produced in the fifth to seventh aspects is cast after the addition of a metal having a low α-ray emission produced in the fifth to seventh aspects such as silver having an α-ray emission of 0.002 cph/cm$^2$ or less thereto, thereby producing a tin alloy, and thus, similar to the invention based on the fifth aspect, theoretically, it is possible to produce a tin alloy having a low α-ray emission regardless of the concentration of $^{210}$Pb in a tin raw material being used.

BEST MODE FOR CARRYING OUT THE INVENTION

Next, embodiments for carrying out the present invention will be described on the basis of drawings.

There are a large number of radioactive elements emitting α rays, but the majority thereof has an extremely long half-life period or an extremely short half-life period, and thus no actual problem is caused.

Figure 2:
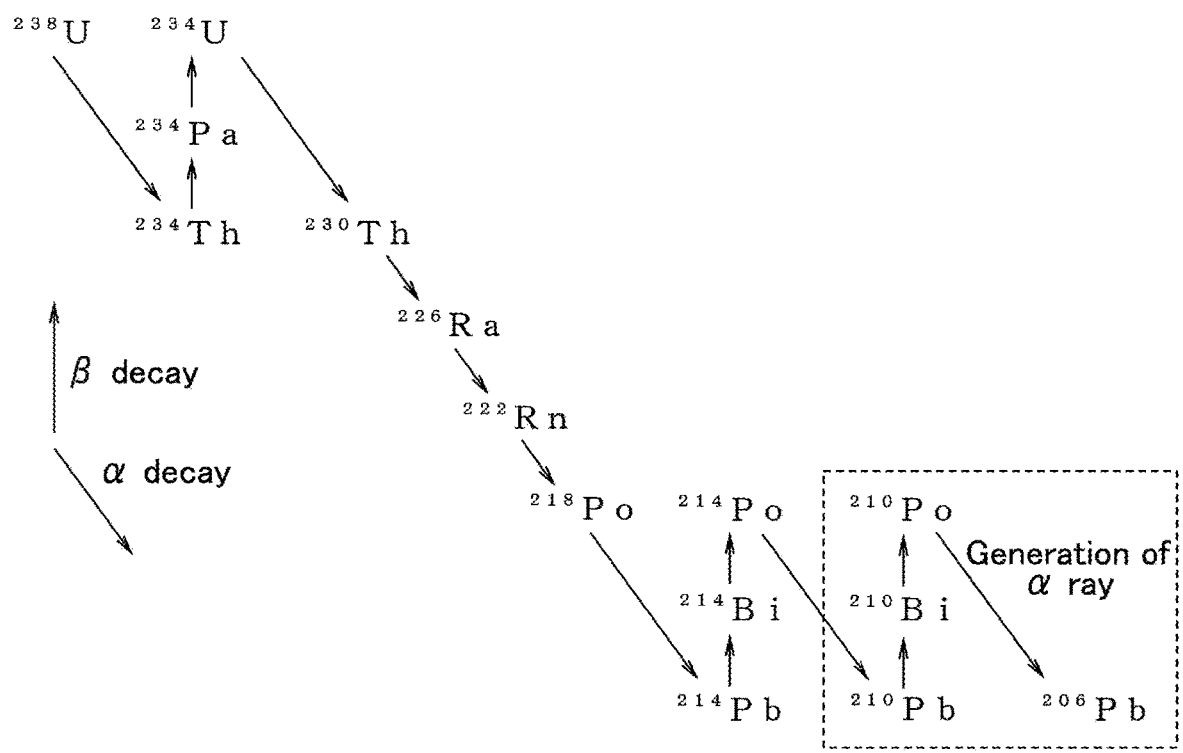
FIG. 2 is a view showing a decay chain (uranium or radium decay series) in which uranium (U) decays and reaches $^{206}$Pb.

A matter that causes an actual problem is, for example, an α ray as one kind of radioactive ray that is emitted during α decay from an isotope of polonium $^{210}$Po to an isotope of lead $^{206}$Pb after β decay of $^{210}$Pb→$^{210}$Bi→$^{210}$Po in a U decay chain shown in a broken-line frame in FIG. 2.

Particularly, regarding the emission mechanism of an α ray from tin that is used for soldering, the above-described fact has been clarified by investigation in the past. Here, Bi has a short half-life period and thus can be managerially ignored.

In summary, an α ray source of tin is mainly $^{210}$Po, but the amount of $^{210}$Pb that is an emission source of $^{210}$Po mainly has an influence on the α-ray emission.

First Embodiment

First, a method for producing any metal having a low α-ray emission of tin, silver, copper, zinc, and indium (metallic material for a solder material) of a first embodiment of the present invention will be described in an order of steps shown in FIG. 1 or on the basis of a production apparatus shown in FIG. 3.

<Step (a) and Step (b)>
[Metallic Raw Material]

Regarding a metallic raw material for obtaining any metal having a low α-ray emission of tin, silver, copper, zinc, and indium (represented by M in FIG. 1) of the first embodiment, the selection of the metallic raw material is not restricted by the degree of the content of Pb as an impurity or the α-ray emission.

For example, even when a metal such as commercially available tin including Pb at a concentration of approximately 320 mass-ppm and an α-ray emission by Pb being approximately 9 cph/cm$^2$ is used as the metallic raw material, in the metal that is obtained in the end using a production method and a production apparatus described below, it is possible to adjust the α-ray emission after heating the metal at 100° C. or 200° C. in an atmosphere for six hours to 0.002 cph/cm$^2$ or less.

The shape of the metallic raw material is not limited and may be a powder form or a massive form. In order to accelerate the dissolving rate, a method in which electrolytic elution is carried out using a hydrogen ion-exchange membrane may be employed.

[Preparation of Hydrosulfate Aqueous Solution and Precipitation Separation of Lead Sulfate]

Figure 1:
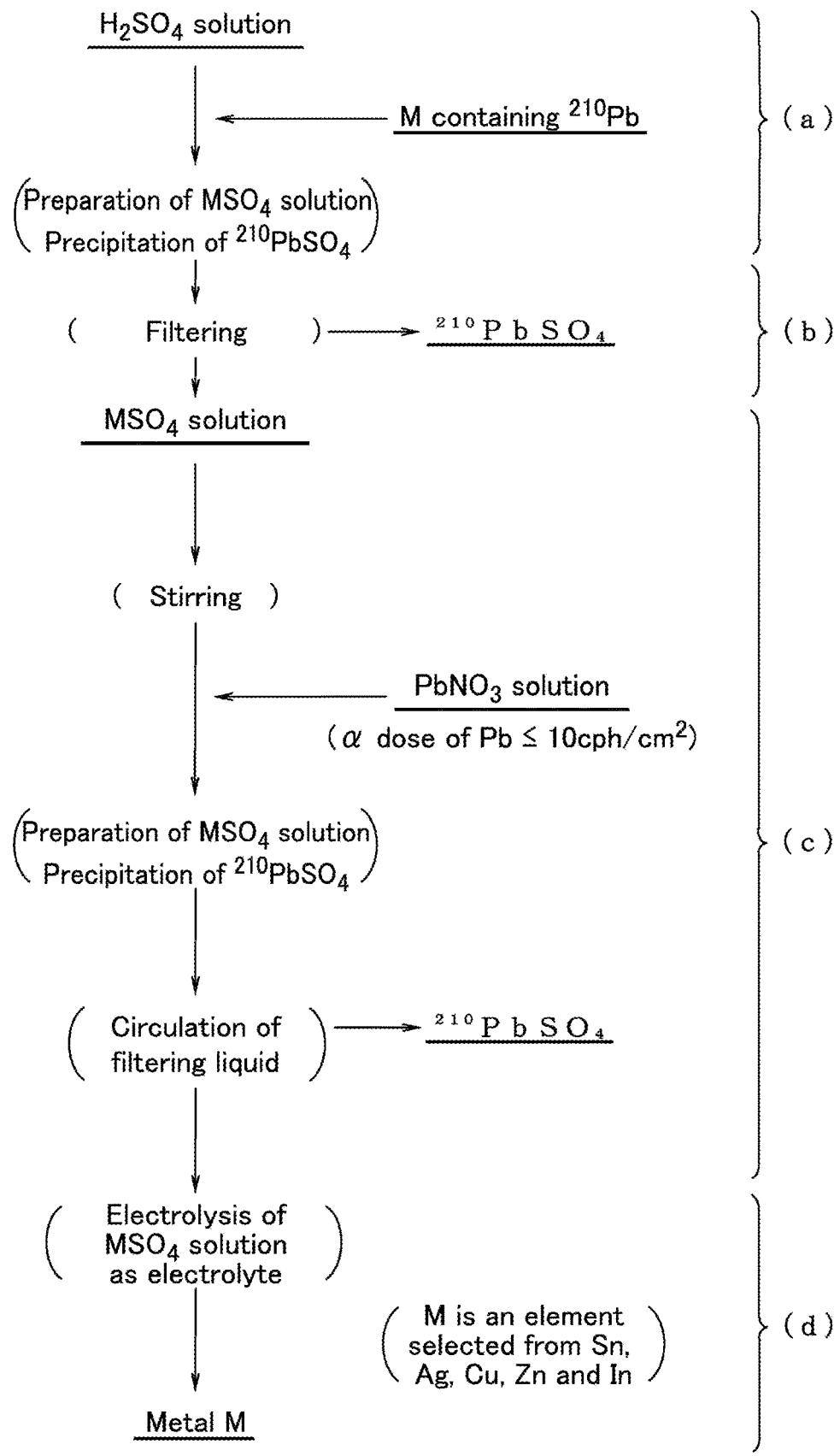
FIG. 1 is a flowchart showing individual steps of a method for producing any metal having a low α-ray emission of tin, silver, copper, zinc, and indium of the present invention.
Figure 3:
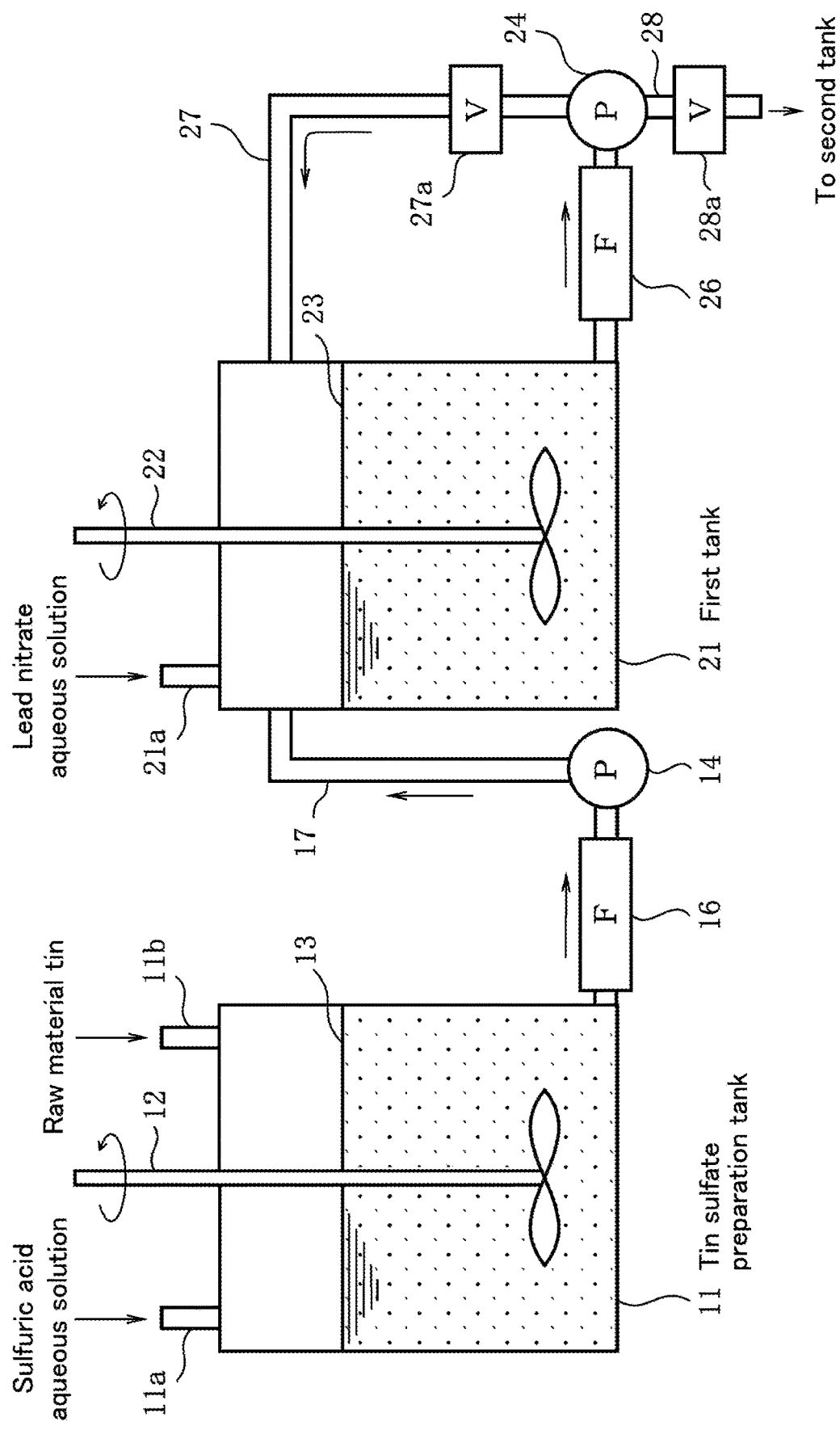
FIG. 3 is a view showing a part of a device for producing a metal having a low α-ray emission of the present embodiment.

In a step (a) and a step (b) shown in FIG. 1, as shown in FIG. 3, a sulfuric acid aqueous solution ($H_2SO_4$) is introduced to a hydro sulfate preparation tank 11 from a supply opening 11a and stored in the tank 11, the metallic raw material is added thereto from a supply opening 11b, and the components are stirred using a stirrer 12 to dissolve the metallic raw material in the sulfuric acid aqueous solution, thereby preparing a hydrosulfate ($MSO_4$) aqueous solution 13 of the metallic raw material.

Specifically, aqueous solutions of tin sulfate, silver sulfate, copper sulfate, zinc sulfate, and indium sulfate are prepared. Hereinafter, this aqueous solution will be referred to as the hydrosulfate aqueous solution. At this time, in a lower portion of the hydrosulfate preparation tank 11, lead (Pb) in the metallic raw material is precipitated in a form of lead sulfate ($PbSO_4$).

The hydrosulfate aqueous solution is transported to a next first tank 21 using a pump 14 provided outside the hydrosulfate preparation tank 11 through a filter 16 (hereinafter, referred to as the filtering) and through a transportation pipe 17.

Lead sulfate precipitated in the lower portion of the hydrosulfate preparation tank 11 by the filter 16 is removed from the hydrosulfate aqueous solution. As the filter 16, a membrane filter is preferred. A pore diameter of the filter is preferably in a range of 0.1 μm to 10 μm.

<Step (c)>
[Decrease in Lead ($^{210}$Pb)]

In a step (c) shown in FIG. 1, the hydrosulfate aqueous solution 23 which has been transported using the pump 14 and from which lead sulfate has been removed is stored in the first tank 21 shown in FIG. 3. When the amount of the hydrosulfate aqueous solution stored in the first tank 21 reaches a predetermined amount, a predetermined concentration of a lead nitrate aqueous solution including lead (Pb) having a low α-ray emission of 10 cph/cm$^2$ or less is added to the first tank 21 from the supply opening 21a, and the hydrosulfate aqueous solution 23 is stirred using the stirrer 22 at a rotation rate of at least 100 rpm.

Here, the hydrosulfate aqueous solution 23 of the metallic raw material from which lead sulfate has been removed is adjusted to a temperature of 10° C. to 50° C., and the lead nitrate aqueous solution including lead (Pb) having a low α-ray emission is added thereto at a predetermined addition rate for 30 minutes or longer. Therefore, lead sulfate ($PbSO_4$) is precipitated in the hydrosulfate aqueous solution in the lower portion of the first tank 21.

This lead nitrate aqueous solution is prepared by, for example, mixing Pb having a surface α-ray emission of 10 cph/cm² and a purity of 99.99% into a nitric acid aqueous solution. In the step, lead ($^{210}Pb$) that is a radioactive isotope and an ion of lead (Pb) that is a stable isotope which are impurities that are included in the metallic raw material and a cause of a high α-ray emission are mixed together in liquid and then removed, and the content of the lead ($^{210}Pb$) that is a radioactive isotope in the liquid is gradually decreased.

The concentration of hydrosulfate in the hydrosulfate aqueous solution of the metallic raw material is preferably set to 100 g/L or more and 250 g/L or less. The concentration of sulfuric acid ($H_2SO_4$) in the hydrosulfate aqueous solution is preferably set to 10 g/L or more and 50 g/L or less.

At a stirring rate of the hydrosulfate aqueous solution being slower than 100 rpm, lead sulfate is precipitated before the hydrosulfate aqueous solution and a lead ion in the lead nitrate aqueous solution are sufficiently mixed together, and thus it is not possible to substitute an ion of the lead ($^{210}Pb$) that is a radioactive isotope in the hydrosulfate aqueous solution into an ion of the lead (Pb) that is a stable isotope. The upper limit value of the stirring rate is a rotation rate at which the liquid is not scattered by stirring and is determined by the size of the first tank 21 that is a reaction tank and the size and shape of a blade of the stirrer 22. Here, regarding the size of the first tank 21, a cylindrical container having a diameter of approximately 1.5 m can be used, and, as the blade of the stirrer 22, a blade having a size of approximately 0.5 m and a propeller shape can be used.

The α-ray emission of lead included in the lead nitrate aqueous solution is a low α-ray emission of 10 cph/cm² or less which is the same as that of lead that forms an alloy with the raw material tin in PTL 1. The reason for setting the α-ray emission to 10 cph/cm² or less is that, when the α-ray emission exceeds 10 cph/cm², it is not possible to set to the α-ray emission of the metallic raw material obtained in the end to 0.002 cph/cm² or less. In addition, the concentration of lead nitrate in the lead nitrate aqueous solution is preferably 10% by mass to 30% by mass. When the concentration is less than 10% by mass, the reaction time between the hydrosulfate aqueous solution and the lead nitrate aqueous solution lingers, and the production efficiency is likely to deteriorate, and, when the concentration exceeds 30% by mass, lead nitrate is not efficiently used and is likely to be wasted.

In addition, the addition rate of the lead nitrate aqueous solution is preferably 1 mg/second to 100 mg/second and more preferably 1 mg/second to 10 mg/second with respect to 1 L of the hydrosulfate aqueous solution. This addition rate depends on the concentration of lead nitrate in the lead nitrate aqueous solution. When the addition rate is slower than 1 mg/second, the reaction time between the hydrosulfate aqueous solution and the lead nitrate aqueous solution lingers, and the production efficiency is likely to deteriorate, and, when the reaction time exceeds 100 mg/second, lead nitrate is not efficiently used and is likely to be wasted.

Furthermore, the reason for adding the lead nitrate aqueous solution for 30 minutes or longer is that, even when the concentration and the addition rate of the lead nitrate aqueous solution are increased, the lead ($^{210}Pb$) that is a radioactive isotope is decreased at a certain proportion, and it is necessary to add the aqueous solution for a certain period of time in order to sufficiently decrease the lead. Therefore, when the addition time is shorter than 30 minutes, it is not possible to decrease the α-ray emission of the metallic raw material to a desired value or less.

Back to FIG. 3, in the step (c) shown in FIG. 1, at the same time as the addition, the hydrosulfate aqueous solution 23 having a temperature of 10° C. to 50° C. in the first tank 21 is transported to a circulation pipe 27 using a pump 24 provided outside the first tank 21 through a filter 26 or transported to a next second tank, not shown, through a transportation pipe 28.

The circulation pipe 27 and the transportation pipe 28 are respectively provided with opening and closing valves 27a and 28a. When the pump 24 is activated to open the valve 27a and close the value 28a while removing residual lead sulfate ($PbSO_4$) from the hydrosulfate aqueous solution 23 using the filter 26 in the first tank 21, the hydrosulfate aqueous solution 23 is circulated through the circulation pipe 27 at a circulation flow rate being a proportion of at least 1% by volume of the total liquid amount in the first tank.

This circulation of the hydrosulfate aqueous solution removes surplus lead sulfate in the liquid and causes the ion of the lead ($^{210}Pb$) that is a radioactive isotope and the ion of the lead (Pb) that is a stable isotope in the hydrosulfate aqueous solution to be smoothly substituted with each other.

The reason for setting the circulation flow rate to at least 1% by volume (1% by volume or more) is that, when the circulation flow rate is slower than 1% by volume, the liquid amount of the hydrosulfate aqueous solution passing through the filter 26 becomes small, and the trapping efficiency of lead sulfate floating in the liquid by the filter 26 decreases. When the trapping efficiency decreases, a large amount of lead sulfate remains in the hydrosulfate aqueous solution, and the ion of the lead ($^{210}Pb$) that is a radioactive isotope and the ion of the lead (Pb) that is a stable isotope in the hydrosulfate aqueous solution are not smoothly substituted with each other.

As the filters 26, the above-described membrane filter can be used.

<Step (d)>

[Electrowinning of any Metal of Tin, Silver, Copper, Zinc, and Indium]

Next, the value 27a is closed, and the valve 28a is opened, thereby transporting the hydrosulfate aqueous solution having a decreased α dose of the ion of the lead ($^{210}Pb$) to the separate second tank, not shown, from the first tank 21 after being filtered by the filter 26.

The hydrosulfate aqueous solution having a temperature of 10° C. to 50° C. is used as an electrolytic solution, a titanium platinum plate and an SUS plate are respectively disposed as an anode and a cathode in the electrolytic solution, and the hydrosulfate aqueous solution is electrolyzed in the second tank, thereby precipitating any metal of tin, silver, copper, zinc, and indium in the cathode. The metal precipitated in the cathode is collected, and dissolved and cast as necessary, thereby obtaining an ingot of the metal. It is also possible to obtain a plate-shaped metal by rolling a part of the ingot.

Therefore, it is possible to produce metallic tin (Sn), metallic silver (Ag), metallic copper (Cu), metallic zinc (Zn), or metallic indium (In) having a low α-ray emission (a metallic tin material for a solder material, a metallic silver material for a solder material, a metallic copper material for a solder material, a metallic zinc material for a solder material, or a metallic indium material for a solder material) in which the α-ray emission in the initial phase of production and even after a long period of time elapses from production is 0.002 cph/cm² or less, and the α-ray emission is 0.002 cph/cm² or less even after the metal is heated at 100° C. or 200° C. in an atmosphere for six hours.

In addition, according to the above-described production method, it is also possible to produce metallic tin (Sn), metallic silver (Ag), metallic copper (Cu), metallic zinc (Zn), or metallic indium (In) having a low α-ray emission in which the α-ray emission in the initial phase of production and even after a long period of time elapses from production is 0.001 cph/cm² or less, and the α dose is 0.001 cph/cm² or less even after the metal is heated at 100° C. or 200° C. in an atmosphere for six hours.

Furthermore, according to the above-described production method, it is also possible to produce metallic tin (Sn), metallic silver (Ag), metallic copper (Cu), metallic zinc (Zn), or metallic indium (In) having a low α-ray emission in which the α-ray emission in the initial phase of production and even after a long period of time elapses from production is 0.0005 cph/cm² or less, and the a dose is 0.0005 cph/cm² or less even after the metal is heated at 100° C. or 200° C. in an atmosphere for six hours.

Second Embodiment

Next, a method for producing a tin alloy having a low α-ray emission of a second embodiment of the present invention will be described.

In this production method, a tin alloy is produced by casting metallic tin (Sn) having a low α-ray emission obtained in the first embodiment and one or more kinds of metals selected from a group consisting of silver, copper, zinc, indium, bismuth, nickel, and germanium.

Here, as the metal that forms an alloy with the metallic tin, in the case of using the tin alloy as a solder, silver, copper, zinc, and indium are preferred from the viewpoint of the dissolving point and mechanical characteristics of the solder. In order to attain the object of the present invention, the α-ray emission of silver, copper, zinc, indium, bismuth, or nickel that forms an alloy with the metallic tin is 0.002 cph/cm² or less.

In the present embodiment, for the casting, it is possible to use a furnace that is generally used for casting, for example, a high-frequency induction dissolving furnace. In addition, as an atmosphere during the casting, a vacuum atmosphere or an inert gas atmosphere such as nitrogen or argon are exemplified. Furthermore, in order to prevent contamination, a dissolving furnace exclusively for a low α-ray alloy is preferably used.

In the tin alloy obtained in the second embodiment, similar to the metal obtained in the first embodiment, the α-ray emission in the initial phase of production and even after a long period of time elapses from production is 0.002 cph/cm² or less, and the α-ray emission is 0.002 cph/cm² or less even after the tin alloy is heated at 100° C. or 200° C. in an atmosphere for six hours.

EXAMPLES

Next, examples of the present invention will be described in detail together with comparative examples.

Example 1

As a metallic raw material, commercially available Sn powder having an α-ray emission of 10.2 cph/cm² and a concentration of Pb being 15 ppm was used, and this metallic raw material was added to and mixed with a sulfuric acid aqueous solution having a concentration of 130 g/L stored in a tin sulfate preparation tank and dissolved at 50° C., thereby preparing 200 g/L of a tin sulfate aqueous solution 1 m³. Therefore, Pb contained in the tin that was the metallic raw material was precipitated in a form of lead sulfate. The tin sulfate aqueous solution was filtered by being passed through a membrane filter (pore diameter: 0.2 μm) manufactured by Yuasa Membrane Systems Co., Ltd., thereby removing lead sulfate.

Next, in a first tank, while stirring the tin sulfate aqueous solution from which lead sulfate has been removed at a rotation rate of 100 rpm, a lead nitrate aqueous solution (the concentration of lead nitrate: 20% by mass) including Pb having an α-ray emission of 5 cph/cm² is added to this aqueous solution at a rate of 1 mg/second·L (1,000 mg/second) for 30 minutes. As the first tank, a cylindrical container having a diameter of approximately 1.5 m was used.

At the same time as the above-described addition, the tin sulfate aqueous solution was passed through the same membrane filter as described above, thereby removing lead sulfate from the tin sulfate aqueous solution, and the tin sulfate aqueous solution was circulated in the first tank so that the circulation flow rate reached a proportion of 1% by volume of the total liquid amount.

After that, the tin sulfate aqueous solution was transported to a second tank from the first tank after being filtered, this tin sulfate aqueous solution was used as an electrolytic solution in the second tank, a titanium platinum plate and an SUS plate were respectively disposed as an anode and a cathode in the electrolytic solution, and the tin sulfate aqueous solution was electrolyzed at a liquid temperature of 30° C. and a cathode current density of 5 A/dm².

The metallic tin precipitated in the cathode was collected, and tabular metallic tin was obtained by rolling as the final product. The above-described production conditions of Example 1 are shown in Table 1. The addition rate of the lead nitrate aqueous solution is an addition rate with respect to 1 L of the tin sulfate aqueous solution. The total amount of the lead nitrate aqueous solution added is an amount added with respect to 1 L of the tin sulfate aqueous solution.

TABLE 1

| | Concentration of Pb in raw material Sn (mass ppm) | Tin sulfate aqueous solution | | α-Ray emission of Pb (cph/cm²) | Lead nitrate aqueous solution | | | Total amount added (mg/L) |
|---|---|---|---|---|---|---|---|---|
| | | Stirring rate (rpm) | Circulation rate (% by volume) | | Concentration of lead nitrite (% by mass) | Addition rate (mg/second · L) | Addition time (minutes) | |
| Example 1 | 15 | 100 | 1 | 10 | 20 | 1 | 30 | 360 |
| Example 2 | 15 | 500 | 1 | 10 | 20 | 1 | 30 | 360 |
| Example 3 | 15 | 1000 | 1 | 10 | 20 | 1 | 30 | 360 |
| Example 4 | 15 | 500 | 1 | 10 | 10 | 1 | 30 | 180 |

TABLE 1-continued

|  | Concentration of Pb in raw material Sn (mass ppm) | Tin sulfate aqueous solution | | α-Ray emission of Pb (cph/cm²) | Lead nitrate aqueous solution | | | Total |
|  |  | Stirring rate (rpm) | Circulation rate (% by volume) |  | Concentration of lead nitrite (% by mass) | Addition rate (mg/second · L) | Addition time (minutes) | amount added (mg/L) |
| --- | --- | --- | --- | --- | --- | --- | --- | --- |
| Example 5 | 15 | 500 | 1 | 10 | 20 | 1 | 30 | 360 |
| Example 6 | 15 | 500 | 1 | 10 | 30 | 1 | 30 | 540 |
| Example 7 | 15 | 500 | 1 | 10 | 40 | 1 | 30 | 720 |
| Example 8 | 15 | 500 | 1 | 10 | 20 | 1 | 30 | 360 |
| Example 9 | 15 | 500 | 1 | 10 | 20 | 10 | 30 | 3600 |
| Example 10 | 15 | 500 | 1 | 10 | 20 | 100 | 30 | 36000 |
| Example 11 | 150 | 500 | 1 | 10 | 20 | 1 | 30 | 360 |
| Example 12 | 240 | 500 | 1 | 10 | 20 | 1 | 30 | 360 |
| Example 13 | 320 | 500 | 1 | 10 | 20 | 1 | 30 | 360 |
| Example 14 | 15 | 500 | 1 | 10 | 5 | 1 | 60 | 180 |
| Example 15 | 15 | 500 | 1 | 10 | 1 | 1 | 300 | 180 |
| Example 16 | 15 | 500 | 1 | 10 | 20 | 0.5 | 60 | 360 |
| Comparative Example 1 | 15 | 50 | 1 | 10 | 20 | 1 | 30 | 360 |
| Comparative Example 2 | 15 | 500 | 0.5 | 10 | 20 | 1 | 30 | 360 |
| Comparative Example 3 | 15 | 500 | 1 | 10 | 40 | 1 | 20 | 480 |
| Comparative Example 4 | 15 | 500 | 1 | 10 | 20 | 1 | 20 | 240 |
| Comparative Example 5 | 15 | 500 | 1 | 10 | 20 | 10 | 20 | 2400 |
| Comparative Example 6 | 15 | 500 | 1 | 10 | 20 | 100 | 20 | 24000 |
| Comparative Example 7 | 15 | 500 | 1 | 12 | 20 | 1 | 30 | 360 |
| Comparative Example 8 | 240 | — | — | 10 | — | — | — | — |
| Comparative Example 9 | 240 | — | — | — | — | — | — | — |

Examples 2 to 16 and Comparative Examples 1 to 7

In Examples 2 to 16 and Comparative Examples 1 to 7, the raw material tin, the stirring rates and the circulation rates of the tin sulfate aqueous solution, the α dose of Pb in the lead nitrate aqueous solution, the concentrations of lead nitrate, the addition rates, and the addition times described in Example 1 were changed as shown in Table 1. Hereinafter, tabular metallic tin that was a final product was obtained in the same manner as in Example 1.

Comparative Example 8

In Comparative Example 8, tabular metallic tin that was a final product was obtained according to Example 1 in PTL 1 described in the background art of the present specification. Specifically, commercially available Si having a surface α-ray emission of 5 cph/cm², a purity of 99.99%, and a concentration of Pb being 240 ppm and commercially available Pb having a surface α-ray emission of 10 cph/cm² and a purity of 99.99% were prepared, Sn and Pb were dissolved in a high-purity graphite crucible using a high-frequency induction furnace in a nitrogen atmosphere, thereby producing a Sn-5 wt % Pb alloy, this alloy was put into the high-purity graphite crucible, heated and fused to evaporate and remove Pb, and cooled, and then Sn remaining in the crucible was rolled, thereby producing a Sn plate having a low α-ray emission.

Comparative Example 9

In Comparative Example 9, tabular metallic tin that was a final product was obtained according to Example 1 in PTL 2 described in the background art of the present specification. Specifically, as raw material tin, commercially available Sn powder having an α-ray emission of 9.2 cph/cm² and a concentration of Pb being 240 ppm was prepared. This raw material tin was leached using sulfuric acid, and this leached liquid was used as an electrolytic solution. In addition, as an anode, a 3 N-level Sn plate was used. This plate was electrolyzed under conditions of an electrolysis temperature of 20° C. and a current density of 1 A/dm². The metallic tin precipitated in a cathode was collected, and tabular metallic tin that was a final product was obtained by rolling.

<Comparative Testing and Evaluation 1>

For the twenty five kinds of metallic tin that were a final products obtained in Examples 1 to 16 and Comparative Examples 1 to 9, the concentration of Pb in the metallic tin and the α-ray emission by Pb were measured before heating, after heating, and after one year had elapsed from heating and slow cooling using methods described below. The results are shown in Table 2.

TABLE 2

| | Kind | Concentration of Pb (mass ppm) | Final product α-Ray emission (cph/cm²) | | | |
|---|---|---|---|---|---|---|
| | | | Before heating | After heating (100° C.) | After heating (200° C.) | After one year |
| Example 1 | Sn | 2 | <0.0005 | <0.0005 | 0.0005 | <0.0005 |
| Example 2 | Sn | 2 | <0.0005 | <0.0005 | <0.0005 | <0.0005 |
| Example 3 | Sn | 3 | 0.0005 | <0.0005 | <0.0005 | <0.0005 |
| Example 4 | Sn | 2 | <0.0005 | <0.0005 | <0.0005 | <0.0005 |
| Example 5 | Sn | 2 | <0.0005 | 0.0005 | <0.0005 | <0.0005 |
| Example 6 | Sn | 2 | <0.0005 | <0.0005 | <0.0005 | <0.0005 |
| Example 7 | Sn | 3 | <0.0005 | <0.0005 | <0.0005 | <0.0005 |
| Example 8 | Sn | 2 | 0.0007 | <0.0005 | <0.0005 | <0.0005 |
| Example 9 | Sn | 2 | <0.0005 | <0.0005 | 0.0006 | <0.0005 |
| Example 10 | Sn | 2 | <0.0005 | <0.0005 | <0.0005 | <0.0005 |
| Example 11 | Sn | 2 | 0.0006 | <0.0005 | <0.0005 | <0.0005 |
| Example 12 | Sn | 2 | <0.0005 | <0.0005 | <0.0005 | <0.0005 |
| Example 13 | Sn | 2 | 0.0005 | <0.0005 | 0.0005 | <0.0005 |
| Example 14 | Sn | 3 | <0.0005 | <0.0005 | <0.0005 | <0.0005 |
| Example 15 | Sn | 2 | <0.0005 | <0.0005 | <0.0005 | <0.0005 |
| Example 16 | Sn | 2 | <0.0005 | <0.0005 | <0.0005 | <0.0005 |
| Comparative Example 1 | Sn | 3 | <0.0005 | 0.0024 | 0.0027 | 0.0135 |
| Comparative Example 2 | Sn | 2 | <0.0005 | 0.0021 | 0.0025 | 0.0186 |
| Comparative Example 3 | Sn | 2 | <0.0005 | 0.0022 | 0.0022 | 0.0045 |
| Comparative Example 4 | Sn | 3 | 0.0006 | 0.0025 | 0.0029 | 0.0043 |
| Comparative Example 5 | Sn | 2 | <0.0005 | 0.0023 | 0.0025 | 0.0038 |
| Comparative Example 6 | Sn | 2 | 0.0007 | 0.0024 | 0.0031 | 0.0032 |
| Comparative Example 7 | Sn | 3 | 0.0008 | 0.0021 | 0.0025 | 0.0076 |
| Comparative Example 8 | Sn | 2 | <0.0005 | 0.0026 | 0.0027 | 0.0021 |
| Comparative Example 9 | Sn | 0.2 | 0.0008 | 0.0021 | 0.0023 | 0.0032 |

(a) Concentration of Pb in Metallic Tin

For the concentration of Pb in the metallic tin, the tabular metallic tin was used as a specimen, this specimen was dissolved in hot hydrochloric acid, the obtained liquid was analyzed using ICP (plasma emission spectrometric analysis instrument, determination limit: 1 mass-ppm), and the amount of Pb as an impurity was measured.

(b) α-Ray Emission by Pb in Metallic Tin

First, the obtained tabular metallic tin was used as a specimen 1 before heating. The α dose emitted from the specimen 1 before heating was measured for 96 hours using a gas flow-type α-ray measurement instrument (MODEL-1950, measurement lower limit: 0.0005 cph/cm²) manufactured by Alpha Science, Inc. The measurement lower limit is 0.0005 cph/cm². The α-ray emission at this time was regarded as the α-ray emission before heating.

Next, the specimen 1 measured before heating was heated at 100° C. in an atmosphere for six hours and then slowly cooled to room temperature, thereby producing a specimen 2. The α-ray emission of this specimen 2 was measured using the same method as for the specimen 1. The α-ray emission at this time was regarded as "after heating (100° C.)".

Next, the specimen 2 for which the measurement of the α-ray emission was finished was heated at 200° C. in an atmosphere for six hours and then slowly cooled to room temperature, thereby producing a specimen 3. The α-ray emission of this specimen 3 was measured using the same method as for the specimen 1. The α-ray emission at this time was regarded as "after heating (200° C.)".

Furthermore, the specimen 3 was packed in a vacuum in order to prevent contamination and stored for one year, thereby producing a specimen 4, the α-ray emission of this specimen 4 was measured using the same method as for the specimen 1. The α-ray emission at this time was regarded as "after one year".

As is clear from Table 2, in Comparative Example 1, the stirring rate of the tin sulfate aqueous solution at the time of adding the lead nitrate aqueous solution was set to 50 rpm, and thus the lead ($^{210}$Pb) that was a radioactive isotope in the raw material tin was not sufficiently decreased, and the α dose of the metallic tin before heating was less than 0.0005 cph/cm², but increased to 0.0024 cph/cm² after heating at 100° C., to 0.0027 cph/cm² after heating at 200° C., and, furthermore, to 0.0135 cph/cm² after one year respectively.

In Comparative Example 2, the circulation rate of the tin sulfate aqueous solution during and after the addition of the lead nitrate aqueous solution was set to 0.5% by volume with respect to 1 L of the tin sulfate aqueous solution, and thus the lead ($^{210}$Pb) that was a radioactive isotope in the raw material was not sufficiently decreased, and the α dose of the metallic tin before heating was less than 0.0005 cph/cm², but increased to 0.0021 cph/cm² after heating at 100° C., to 0.0025 cph/cm² after heating at 200° C., and, furthermore, to 0.0186 cph/cm² after one year respectively.

In Comparative Example 3, the addition time was set to 20 minutes regardless of the fact that the concentration of lead nitrate in the lead nitrate aqueous solution was increased to 40% by mass, and thus the lead ($^{210}$Pb) that was a radioactive isotope in the raw material tin was not sufficiently decreased, and the α dose of the metallic tin before heating was less than 0.0005 cph/cm², but increased to 0.0022 cph/cm² respectively after heating at 100° C. and 200° C., and, furthermore, increased to 0.0045 cph/cm² after one year.

In Comparative Example 4, the concentration of lead nitrate in the lead nitrate aqueous solution was set to 20% by mass, and the addition time was set to 20 minutes, and thus the lead ($^{210}$Pb) that was a radioactive isotope in the raw material tin was not sufficiently decreased, and the α dose of the metallic tin before heating was 0.0006 cph/cm², but increased to 0.0025 cph/cm² after heating at 100° C., to 0.0029 cph/cm² after heating at 200° C., and, furthermore, to 0.0043 cph/cm² after one year respectively.

In Comparative Example 5, the addition time was set to 20 minutes regardless of the fact that the addition rate of the lead nitrate aqueous solution was increased to 10 mg/second, and thus the lead ($^{210}$Pb) that was a radioactive isotope in the raw material tin was not sufficiently decreased, and the α dose of the metallic tin before heating was less than 0.0005 cph/cm², but increased to 0.0023 cph/cm² after heating at 100° C., to 0.0025 cph/cm² after heating at 200° C., and, furthermore, to 0.0038 cph/cm² after one year respectively.

In Comparative Example 6, the addition time was set to 20 minutes regardless of the fact that the addition rate of the lead nitrate aqueous solution was increased to 100 mg/second, and thus the lead ($^{210}$Pb) that was a radioactive isotope in the raw material tin was not sufficiently decreased, and the α dose of the metallic tin before heating was 0.0007 cph/cm², but increased to 0.0024 cph/cm² after heating at 100° C., to 0.0031 cph/cm² after heating at 200° C., and, furthermore, to 0.0032 cph/cm² after one year respectively.

In Comparative Example 7, the lead nitrate aqueous solution in which the α dose of Pb included in the lead nitrate aqueous solution was 12 cph/cm², and thus the lead ($^{210}$Pb) that was a radioactive isotope in the raw material tin was not sufficiently decreased, and the α dose of the metallic tin before heating was 0.0008 cph/cm², but increased to 0.0021 cph/cm² after heating at 100° C., to 0.0025 cph/cm² after heating at 200° C., and, furthermore, to 0.0076 cph/cm² after one year respectively.

The α dose of the metallic tin produced under the conditions described in Example 1 of PTL 1 of Comparative Example 8 was less than 0.0005 cph/cm² before heating, but increased to 0.0026 cph/cm² after heating at 100° C., to 0.0027 cph/cm² after heating at 200° C., and, furthermore, to 0.0021 cph/cm² after one year respectively.

The α dose of the metallic tin produced under the conditions described in Example 1 of PTL 2 of Comparative Example 9 was less than 0.0008 cph/cm² before heating, but increased to 0.0021 cph/cm² after heating at 100° C., to 0.0023 cph/cm² after heating at 200° C., and, furthermore, to 0.0032 cph/cm² after one year respectively.

In contrast, in the metallic tin obtained in Examples 1 to 16 in which the production conditions of the fifth aspect of the present invention were satisfied, the α doses of the metallic tin before heating were less than 0.0005 cph/cm² or 0.0005 to 0.0007 cph/cm².

In addition, the α doses of the metallic tin after heating at 100° C. were less than 0.0005 cph/cm² or 0.0005 cph/cm², and the α doses of the metallic tin after heating at 200° C. were less than 0.0005 cph/cm² or 0.0005 to 0.0006 cph/cm².

Furthermore, the α doses of the metallic tin after one year were less than 0.0005 cph/cm². That is, in the metallic tin obtained in Examples 1 to 16, the α doses before heating were less than 0.001 cph/cm², the α doses after heating at 100° C. were 0.001 cph/cm² or less, the α doses after heating at 200° C. were 0.002 cph/cm² or less, and the α doses of the metallic tin after one year were less than 0.0005 cph/cm².

Example 17 and Comparative Example 10

Commercially available Cu powder having an α-ray emission of 0.2 cph/cm² and a concentration of Pb being 15 ppm was used instead of the raw material tin described in Example 1 as the metallic raw material, and a copper sulfate aqueous solution was prepared instead of the tin sulfate aqueous solution described in Example 1.

Example 18 and Comparative Example 11

Commercially available Zn powder having an α-ray emission of 3 cph/cm² and a concentration of Pb being 15 ppm was used instead of the raw material tin described in Example 1 as the metallic raw material, and a zinc sulfate aqueous solution was prepared instead of the tin sulfate aqueous solution described in Example 1.

Example 19 and Comparative Example 12

Commercially available indium powder having an α-ray emission of 5 cph/cm² and a concentration of Pb being 15 ppm was used instead of the raw material tin described in Example 1 as the metallic raw material, and an indium sulfate aqueous solution was prepared instead of the tin sulfate aqueous solution described in Example 1.

The stirring rates and the circulation rates of the hydrosulfate aqueous solution, the α doses of Pb in the lead nitrate aqueous solution, the concentrations of lead nitrate, the addition rates, and the addition times in Examples 17 to 19 and Comparative Examples 10 to 12 were changed as shown in Table 3. Hereinafter, metallic copper, metallic zinc, and metallic indium that were final products were obtained respectively in the same manner as in Example 1.

TABLE 3

| | Metallic raw material | | Hydrosulfate aqueous solution | | Lead nitrate aqueous solution | | | | |
|---|---|---|---|---|---|---|---|---|---|
| | | | | | α-Ray | Concentration | | | Total |
| | Kind | Concentration of Pb (mass ppm) | Stirring rate (rpm) | Circulation rate (% by volume) | emission of Pb (cph/cm²) | of lead nitrite (% by mass) | Addition rate (mg/second · L) | Addition time (minutes) | amount added (mg/L) |
| Example 17 | Cu | 13 | 100 | 1 | 10 | 20 | 1 | 30 | 360 |
| Comparative Example 10 | Cu | 13 | 50 | 1 | 10 | 20 | 1 | 30 | 360 |
| Example 18 | Zn | 21 | 100 | 1 | 10 | 20 | 1 | 30 | 360 |

TABLE 3-continued

|  | Metallic raw material | | Hydrosulfate aqueous solution | | α-Ray emission of Pb (cph/cm²) | Lead nitrate aqueous solution | | | |
|---|---|---|---|---|---|---|---|---|---|
|  | Kind | Concentration of Pb (mass ppm) | Stirring rate (rpm) | Circulation rate (% by volume) | | Concentration of lead nitrite (% by mass) | Addition rate (mg/second · L) | Addition time (minutes) | Total amount added (mg/L) |
| Comparative Example 11 | Zn | 21 | 50 | 0.5 | 10 | 20 | 1 | 30 | 360 |
| Example 19 | In | 9 | 100 | 1 | 10 | 20 | 1 | 30 | 360 |
| Comparative Example 12 | In | 9 | 50 | 1 | 10 | 40 | 1 | 20 | 480 |

<Comparative Testing and Evaluation 2>

For the metallic copper, the metallic zinc, and the metallic indium obtained in Examples 17 to 19 and Comparative Examples 10 to 12, the concentration of Pb in these metals and the α-ray emission by Pb were measured before heating, after heating, and after one year using the above-described methods. The results are shown in Table 4.

TABLE 4

|  |  |  | Final product | | | |
|---|---|---|---|---|---|---|
|  |  |  | α-Ray emission (cph/cm²) | | | |
|  | Kind | Concentration of Pb (mass ppm) | Before heating | After heating (100° C.) | After heating (200° C.) | After one year |
| Example 17 | Cu | 3 | <0.0005 | <0.0005 | 0.0005 | <0.0005 |
| Comparative example 10 | Cu | 2 | <0.0005 | 0.0029 | 0.0031 | 0.0092 |
| Example 18 | Zn | 2 | 0.0005 | <0.0005 | 0.0005 | <0.0005 |
| Comparative example 11 | Zn | 3 | <0.0005 | 0.0026 | 0.0025 | 0.0123 |
| Example 19 | In | 2 | <0.0005 | 0.0005 | <0.0005 | <0.0005 |
| Comparative example 12 | In | 2 | <0.0005 | 0.0031 | 0.0028 | 0.0109 |

As is clear from Table 4, in Comparative Example 10, the stirring rate of the copper sulfate aqueous solution at the time of adding the lead nitrate aqueous solution was set to 50 rpm, and thus the lead ($^{210}$Pb) that was a radioactive isotope in the raw material Cu powder was not sufficiently decreased, and the α dose of the metallic copper before heating was less than 0.0005 cph/cm², but increased to 0.0029 cph/cm² after heating at 100° C., to 0.0031 cph/cm² after heating at 200° C., and, furthermore, to 0.0092 cph/cm² after one year respectively.

In Comparative Example 11, the stirring rate of the zinc sulfate aqueous solution at the time of adding the lead nitrate aqueous solution was set to 50 rpm, and the circulation rate was set to 0.5% by volume, and thus the lead ($^{210}$Pb) that was a radioactive isotope in the raw material Zn powder was not sufficiently decreased, and the α dose of the metallic zinc before heating was less than 0.0005 cph/cm², but increased to 0.0026 cph/cm² after heating at 100° C., to 0.0025 cph/cm² after heating at 200° C., and, furthermore, to 0.0123 cph/cm² after one year respectively.

In Comparative Example 12, the stirring rate of the indium sulfate aqueous solution at the time of adding the lead nitrate aqueous solution was set to 50 rpm, and thus the lead ($^{210}$Pb) that was a radioactive isotope in the raw material indium powder was not sufficiently decreased, and the α dose of the metallic copper before heating was less than 0.0005 cph/cm², but increased to 0.0031 cph/cm² after heating at 100° C., to 0.0028 cph/cm² after heating at 200° C., and, furthermore, to 0.0109 cph/cm² after one year respectively.

In contrast, in the metallic copper, the metallic zinc, and the metallic indium obtained in Examples 17 to 19 in which the production conditions of the fifth aspect of the present invention were satisfied, the α doses of these metals before heating were less than 0.0005 cph/cm².

In addition, the α doses of these metals after heating at 100° C. were less than 0.0005 cph/cm² or 0.0005 cph/cm², and the α doses of the metallic tin after heating at 200° C. were less than 0.0005 cph/cm² or 0.0005 cph/cm². Furthermore, the α doses of the metallic tin after one year were less than 0.0005 cph/cm².

That is, in the metallic copper, the metallic zinc, and the metallic indium obtained in Examples 17 to 19, the α doses before heating were less than 0.001 cph/cm², the α doses after heating at 100° C. were 0.001 cph/cm² or less, the α doses after heating at 200° C. were 0.002 cph/cm² or less, and the α doses of the metallic copper, the metallic zinc, and the metallic indium after one year were less than 0.0005 cph/cm².

Examples 20 to 27 and Comparative Examples 13 to 20

In Examples 20 to 27, the tabular metallic tin obtained in Example 1 was used, and, in Comparative Examples 13 to 20, the tabular metallic tin obtained in Comparative Example 1 was used. The metallic tin and the metallic raw materials of silver, copper, zinc, indium, bismuth, nickel, and germanium having an α-ray emission of 0.002 cph/cm² or less, which are shown in Table 5, were cut, weighed, put into a carbon crucible, and heated at a temperature that was equal to or higher than the dissolving points of the respective metallic raw materials in a vacuum atmosphere using a high-frequency induction vacuum dissolving furnace, thereby casting tin alloys that were final products.

TABLE 5

| Kind of raw material | | α-Ray emission of raw materials other than Sn (cph/cm$^2$) |
|---|---|---|
| Example 20 | Sn, Ag, Cu | <0.002 |
| Comparative Example 13 | Sn, Ag, Cu | <0.002 |
| Example 21 | Sn, Ag | <0.002 |
| Comparative Example 14 | Sn, Ag | <0.002 |
| Example 22 | Sn, Cu | <0.002 |
| Comparative Example 15 | Sn, Cu | <0.002 |
| Example 23 | Sn, Zn | <0.002 |
| Comparative Example 16 | Sn, Zn | <0.002 |
| Example 24 | Sn, Bi | <0.002 |
| Comparative Example 17 | Sn, Bi | <0.002 |
| Example 25 | Sn, In | <0.002 |
| Comparative Example 18 | Sn, In | <0.002 |
| Example 26 | Sn, Ag, Cu, Ni, Ge | <0.002 |
| Comparative Example 19 | Sn, Ag, Cu, Ni, Ge | <0.002 |
| Example 27 | Sn, Ag, Cu, Bi, Ni, Ge | <0.002 |
| Comparative Example 20 | Sn, Ag, Cu, Bi, Ni, Ge | <0.002 |

<Comparative Testing and Evaluation 3>

For the tin alloys that were final products obtained in Examples 20 to 27 and Comparative Examples 13 to 20, the concentration of Pb in these tin alloys and the α-ray emission by Pb were measured before heating, after heating, and after one year using the above-described methods. The results are shown in Table 6.

TABLE 6

| | | | Final product | | | |
|---|---|---|---|---|---|---|
| | | | | α-Ray emission (cph/cm$^2$) | | |
| | Kind | Concentration of Pb (mass ppm) | Before heating | After heating (100° C.) | After heating (200° C.) | After one year |
| Example 20 | Sn—Ag—Cu | 2 | 0.0005 | <0.0005 | 0.0005 | <0.0005 |
| Comparative Example 13 | Sn—Ag—Cu | 2 | <0.0005 | 0.0029 | 0.0028 | 0.012 |
| Example 21 | Sn—Ag | 2 | <0.0005 | 0.0005 | <0.0005 | 0.0006 |
| Comparative Example 14 | Sn—Ag | 2 | 0.0006 | 0.0023 | 0.0025 | 0.0095 |
| Example 22 | Sn—Cu | 2 | 0.0006 | 0.0006 | <0.0005 | <0.0005 |
| Comparative Example 15 | Sn—Cu | 2 | <0.0005 | 0.0024 | 0.0025 | 0.0118 |
| Example 23 | Sn—Zn | 2 | <0.0005 | <0.0005 | 0.0006 | <0.0005 |
| Comparative Example 16 | Sn—Zn | 2 | 0.0005 | 0.0029 | 0.0028 | 0.0109 |
| Example 24 | Sn—Bi | 2 | 0.0005 | <0.0005 | <0.0005 | <0.0005 |
| Comparative Example 17 | Sn—Bi | 2 | <0.0005 | 0.0024 | 0.0027 | 0.0097 |
| Example 25 | Sn—In | 2 | <0.0005 | <0.0005 | <0.0005 | 0.0005 |
| Comparative Example 18 | Sn—In | 2 | 0.0006 | 0.0026 | 0.0027 | 0.0084 |
| Example 26 | Sn—Ag—Cu—Ni—Ge | 2 | <0.0005 | 0.0006 | <0.0005 | <0.0005 |
| Comparative Example 19 | Sn—Ag—Cu—Ni—Ge | 2 | <0.0005 | 0.0021 | 0.0028 | 0.0113 |
| Example 27 | Sn—Ag—Cu—Bi—Ge | 2 | 0.0006 | 0.0007 | 0.0005 | <0.0005 |
| Comparative Example 20 | Sn—Ag—Cu—Bi—Ge | 2 | <0.0005 | 0.0021 | 0.0022 | 0.0109 |

As is clear from Table 6, in Comparative Examples 13 to 20, the tabular metallic tin obtained in Comparative Example 1 was used, and thus the α dose of the tin alloy before heating was less than 0.0005 cph/cm$^2$ or 0.0005 to 0.0006 cph/cm$^2$, but increased to 0.0021 to 0.0029 cph/cm$^2$ after heating at 100° C., to 0.0022 to 0.0028 cph/cm$^2$ after heating at 200° C., and, furthermore, to 0.0084 to 0.0120 cph/cm$^2$ after one year respectively.

In contrast, in Examples 20 to 27, the tabular metallic tin obtained in Example 1 was used, and thus the α doses of the tin alloys before heating obtained in Examples 20 to 27 were less than 0.0005 cph/cm$^2$ or 0.0005 to 0.0006 cph/cm$^2$. In addition, the α doses of the tin alloys after heating at 100° C. were less than 0.0005 cph/cm$^2$ or 0.0005 to 0.0007 cph/cm$^2$, and the α doses of the tin alloys after heating at 200° C. and the α doses of the tin alloys after one year were less than 0.0005 cph/cm$^2$ or 0.0005 to 0.0006 cph/cm$^2$ respectively. That is, in the tin alloys obtained in Examples 20 to 27, the α doses before heating were less than 0.001 cph/cm$^2$, the α doses after heating at 100° C. were 0.001 cph/cm$^2$ or less, the α doses after heating at 200° C. were 0.002 cph/cm$^2$ or less, and the α doses of the tin alloys after one year were less than 0.0005 cph/cm$^2$.

INDUSTRIAL APPLICABILITY

The any metal of tin, silver, copper, zinc and indium having a low α-ray emission or the tin alloy of at least one metal selected from a group consisting of silver, copper, zinc, indium, bismuth, nickel, and germanium and tin having a low α-ray emission of the present invention can be used as a solder material containing, as a principal metal, tin for joining a semiconductor chip in a semiconductor device in which a soft error attributed to the influence of an α ray is considered as a problem.

REFERENCE SIGNS LIST

11 HYDROSULFATE PREPARATION TANK
12, 22 STIRRER
13 HYDROSULFATE AQUEOUS SOLUTION
14, 24 PUMP
16, 26 FILTER
17, 28 TRANSPORTATION PIPE
21 FIRST TANK
23 HYDROSULFATE AQUEOUS SOLUTION
27 CIRCULATION PIPE

The invention claimed is:

1. A method for producing a metal having a low α-ray emission, the method including:
   a step (a) of dissolving any metal of tin, silver, copper, zinc and indium, each including lead as an impurity in a sulfuric acid aqueous solution, to prepare a hydrosulfate aqueous solution of the metal and performing a first precipitation of lead sulfate by precipitating lead sulfate in the hydrosulfate aqueous solution;
   a step (b) of filtering the hydrosulfate aqueous solution obtained from the step (a) to remove the lead sulfate from the hydrosulfate aqueous solution;
   a step (c) of performing a second precipitation of lead sulfate in the hydrosulfate aqueous solution by adding a lead nitrate aqueous solution of a predetermined concentration including lead having an α-ray emission of 10 cph/cm$^2$ or less to the hydrosulfate aqueous solution obtained from the step (b), from which lead sulfate has already been removed, at a predetermined addition rate for 30 minutes or longer while stirring the hydrosulfate aqueous solution at a rotation rate of at least 100 rpm in a first tank, and, at the same time, circulating the hydro sulfate aqueous solution in the first tank at a proportion at which a circulation flow rate reaches at least 1% by volume of a total liquid amount while filtering the hydrosulfate aqueous solution to remove lead sulfate which has precipitated from the hydrosulfate aqueous solution a second time; and
   a step (d) of transferring the hydrosulfate aqueous solution obtained from the step (c) to a separate second tank from the first tank and then electrowinning the metal using the hydrosulfate aqueous solution obtained from step (c) as an electrolytic solution.

2. The method for producing a metal having a low α-ray emission according to claim 1,
   wherein the predetermined concentration of lead nitrate in the lead nitrate aqueous solution of the step (c) is 10% by mass to 30% by mass.

3. The method for producing a metal having a low α-ray emission according to claim 1,
   wherein the predetermined addition rate of the lead nitrate aqueous solution of the step (c) is 1 mg/second to 100 mg/second per one liter of the hydrosulfate aqueous solution.

4. A method for producing a tin alloy having a low α-ray emission, the method including the step of producing the tin alloy having a low α-ray emission by adding one or more metals selected from a group consisting of silver, copper, zinc, indium, bismuth, nickel, and germanium to metallic tin and mixing thereof to obtain a mixture, and casting the mixture,
   wherein
   the metal being added to the metallic tin has an α-ray emission of 0.002 cph/cm$^2$ or less, and wherein the metallic tin is a low α-ray emission tin produced using the method including:
   a step (a) of dissolving tin including lead as an impurity in a sulfuric acid aqueous solution, to prepare a hydrosulfate aqueous solution of the tin and performing a first precipitation of lead sulfate by precipitating lead sulfate in the hydrosulfate aqueous solution;
   a step (b) of filtering the hydrosulfate aqueous solution obtained from the step (a) to remove the lead sulfate from the hydrosulfate aqueous solution;
   a step (c) of performing a second precipitation of lead sulfate in the hydrosulfate aqueous solution by adding a lead nitrate aqueous solution of a predetermined concentration including lead having an α-ray emission of 10 cph/cm$^2$ or less to the hydrosulfate aqueous solution obtained from the step (b), from which lead sulfate has already been removed, at a predetermined addition rate for 30 minutes or longer while stirring the hydrosulfate aqueous solution at a rotation rate of at least 100 rpm in a first tank, and, at the same time, circulating the hydrosulfate aqueous solution in the first tank at a proportion at which a circulation flow rate reaches at least 1% by volume of a total liquid amount while filtering the hydrosulfate aqueous solution to remove lead sulfate which has precipitated from the hydrosulfate aqueous solution a second time; and
   a step (d) of transferring the hydrosulfate aqueous solution obtained from the step (c) to a separate second tank from the first tank and then electrowinning the tin using the hydrosulfate aqueous solution obtained from step (c) as an electrolytic solution.

5. A method for producing a tin alloy having a low α-ray emission, the method including the step of producing the tin alloy having a low α-ray emission by adding one or more metals selected from a group consisting of silver, copper, zinc, and indium to metallic tin and mixing thereof to obtain a mixture, and casting the mixture,
   wherein each of the metallic tin and the one or more metals added to the metallic tin are produced using a method including:
   a step (a) of dissolving any metal of tin, silver, copper, zinc and indium, each including lead as an impurity in a sulfuric acid aqueous solution, to prepare a hydrosulfate aqueous solution of the metal and performing a first precipitation of lead sulfate by precipitating lead sulfate in the hydro sulfate aqueous solution;
   a step (b) of filtering the hydrosulfate aqueous solution obtained from the step (a) to remove the lead sulfate from the hydrosulfate aqueous solution;
   a step (c) of performing a second precipitation of lead sulfate in the hydrosulfate aqueous solution by adding a lead nitrate aqueous solution of a predetermined concentration including lead having an α-ray emission of 10 cph/cm$^2$ or less to the hydrosulfate aqueous solution obtained from the step (b), from which lead sulfate has already been removed, at a predetermined addition rate for 30 minutes or longer while stirring the hydrosulfate aqueous solution at a rotation rate of at least 100 rpm in a first tank, and, at the same time, circulating the hydrosulfate aqueous solution in the first tank at a proportion at which a circulation flow rate reaches at least 1% by volume of a total liquid amount while filtering the hydrosulfate aqueous solution to remove lead sulfate which has precipitated from the hydrosulfate aqueous solution a second time; and a step (d) of transferring the hydrosulfate aqueous solution obtained from the step (c) to a separate second tank from the first tank and then electrowinning the metal using the hydrosulfate aqueous solution obtained from step (c) as an electrolytic solution.

\* \* \* \* \*